Dec. 28, 1954   A. J. SCHMIDT   2,698,375
SPOTLIGHT LENS
Filed March 20, 1951
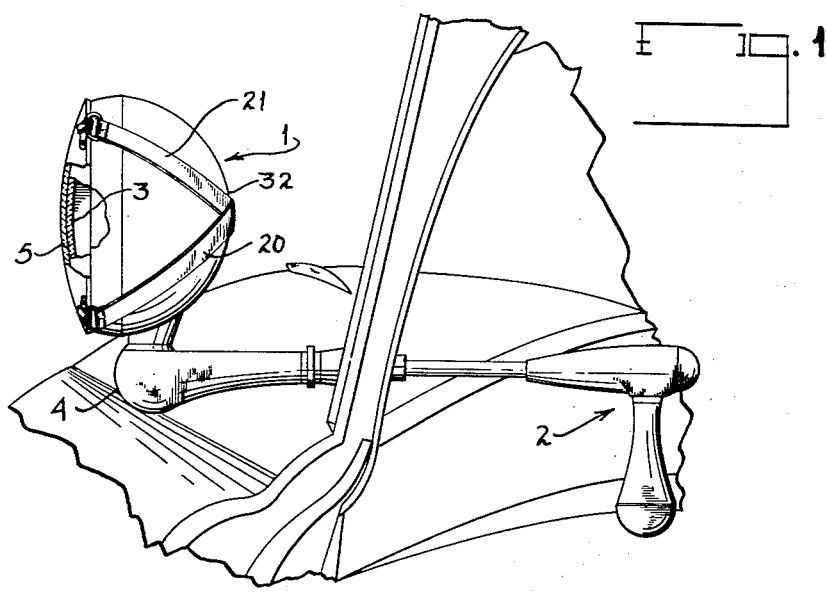
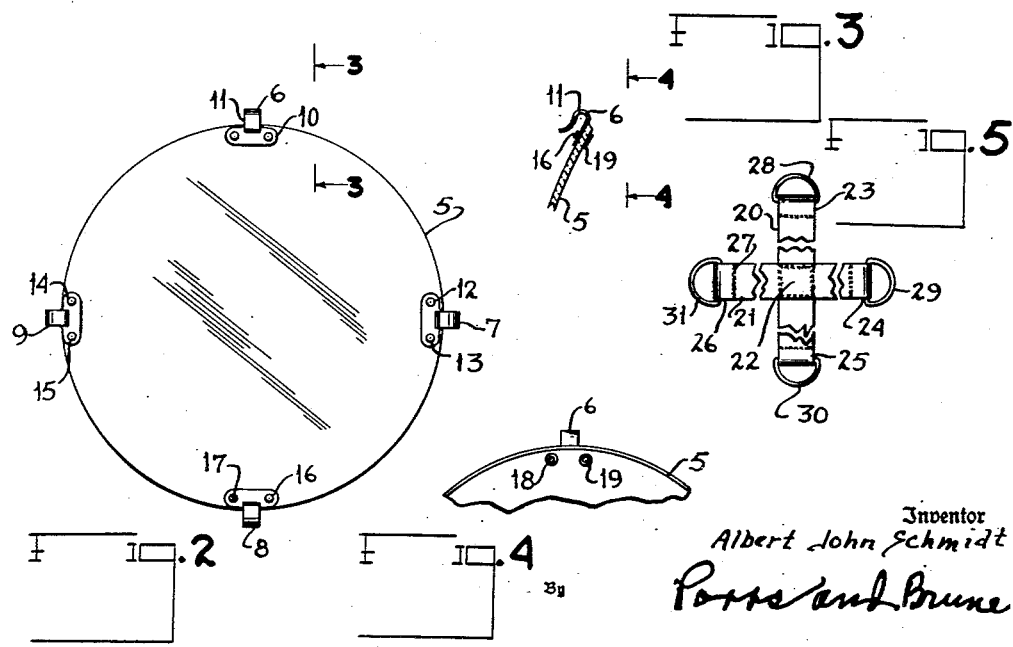
Inventor
Albert John Schmidt
By Potts and Brune
His Attorneys

United States Patent Office 2,698,375
Patented Dec. 28, 1954

2,698,375

SPOTLIGHT LENS

Albert John Schmidt, Chestnut Hill, Pa.

Application March 20, 1951, Serial No. 216,593

2 Claims. (Cl. 240—46.59)

This invention relates to a portable colored lens for vehicle or portable lights normally throwing white light and more particularly to a portable colored plastic lens for portable or vehicle lights normally throwing white light and specifically to a portable colored plastic lens for use on a portable or vehicle spotlight normally throwing white light in case of emergency.

At the present time emergency vehicles such as police and ambulance cars are equipped with oscillable colored lights. However, the degree of oscillation of these lights is very small and when speeding through street intersections adequate warning of the emergency vehicle's presence may not be given due to the small angle through which the light oscillates and the end result may be a collision between the emergency car and the car of a member of the public. At the present time spotlights have suitable universal joints so that they may be moved about an angle of three hundred sixty degrees in any direction, and these spotlights have a white or neutral lens normally throwing white light. For unknown reasons, emergency vehicles, such as police and ambulance cars have failed to use spotlights. The applicant has provided a portable colored lens for a spotlight which will enable the spotlight to throw a colored light, and since the spotlight is movable about an angle of three hundred sixty degrees in any direction, it can be used on emergency vehicles, and hence, will prevent many collisions.

An object of the present invention is to provide a portable colored lens fabricated of plastic for a light which normally throws white light.

Another object is to provide a novel means of holding a portable colored lens over the neutral lens of a light which normally throws white light.

A further object of the present invention is to provide a portable colored lens which is sturdy and durable in construction, and is simple and inexpensive to manufacture.

Other objects and advantages will be apparent from the following description taken in conjunction with the accompanying drawing.

The invention comprises a portable colored lens fabricated of plastic and adapted to be positioned over the white lens of a light, a plurality of clips arranged in spaced relation with respect to each other and secured to the outer face of the portable lens adjacent the periphery thereof, a pair of elastic bands arranged in criss-cross relation with respect to each other and secured together at their crossing point, and a loop secured to each end of the pair of elastic bands, the pair of elastic bands being adapted to extend over a portion of the light and the loops being adapted to hook into the clips.

For a full and complete understanding of the invention, reference is made to the following description and accompanying drawing wherein:

Figure 1 is a wide elevational view of the portable colored lens of the present invention shown assembled on a vehicle spotlight.

Figure 2 is a front view of the portable colored lens of the present invention.

Figure 3 is a view taken on the line 3—3 of Figure 2.

Figure 4 is a view taken on the line 4—4 of Figure 3; and

Figure 5 is a view of the elastic bands and clips for holding the portable colored lens of the present invention on a spotlight, the elastic bands being broken away.

Referring specifically to the drawing, wherein the same reference characters are used through the several views to designate the same or similar parts, the numeral 1 designates a spotlight secured in position on a motor vehicle. The spotlight 1 has an operating means generally designated at 2 and a neutral or white lens 3, the spotlight 1 normally throwing white light. The spotlight 1 has a universal joint at 4 which permits the spotlight 1 to be rotated about an axis of three hundred sixty degrees in any direction by actuation of the operating means 2. More specifically, the spotlight 1 may be swung from side to side or up and down or in a reverse direction. Further, it is to be noted that the lens 3 is curved.

Proceeding to the present invention a portable lens 5 of red or blue color is fabricated of acrylic (an unsaturated acid $CH_2CHCO_2H$ obtainable from acrolein $CH_2CHCHO$ by oxidation) nonshatterable transparent Plexiglas, a plastic. The lens 5 is curved to the configuration of the lens 3 and is normally one-eighth inch thick. One of the essential features of this invention is that almost one hundred per cent of the rays of white light will penetrate through the red or blue plastic lens.

A plurality of clips 6, 7, 8, and 9 fabricated of tempered brass, which is thereafter chrome-plated, are arranged in spaced relation with respect to each other and are secured to the outer face of the portable colored lens 5 adjacent the periphery thereof. Each of the clips 6, 7, 8 and 9 comprises a base 10 and a hook 11 integrally secured to one side of the base 10. The base 10 has a pair of spaced openings 12 and 13. A pair of rivets 14 and 15 are adapted to be received by the openings 12 and 13 and the rivets 14 and 15 project through the lens 5, the ends 16 and 17 of the rivets 14 and 15 are peened over against the base 10 and the other ends of the rivets 14 and 15 adjacent the inner face of the portable lens 5 have their ends rounded as shown at 18 and 19. The rounded ends 18 and 19 provide a one-thirty-second inch clearance or over in the event the portable lens 5 is attached over a dirty white lens of a spotlight. These rounded ends 18 and 19 will keep the portable lens 5 from becoming scratched.

A pair of elastic bands 20 and 21 fabricated of rayon elastic waterproof webbing are arranged in criss-cross relation with respect to each other and are secured together at a crossing point 22. The bands 20 and 21 have ends 23, 24, 25 and 26 which are folded upon themselves and stitched, as at 27. The ends 23, 24, 25 and 26 by being folded upon themselves embrace a plurality of loops 28, 29, 30 and 31 which are adapted to hook onto the hooks 11 of the clips 6, 7, 8 and 9.

*Mode of operation*

First the inner or concave surface of the portable lens 5 is placed in abutting relation over the outer or convex surface of the white lens 3 of the spotlight 1. Then, a pair of adjacent loops, say 28 and 29, are hooked onto the hooks 11 of the clips 6 and 7 leaving the ends 25 and 26 of the bands 20 and 21 free. The ends 25 and 26 are then pulled toward the rear end 32 of the spotlight 1 until the crossing point 22 lies over the rear end 32. Then, the loops 30 and 31 are pulled under the spotlight 1 and hooked onto the hooks 11 of clips 8 and 9.

From the foregoing it will be seen that applicant has provided a portable lens of red or blue color fabricated of plastic which may be placed over the neutral or white lens of a spotlight, which normally throws white light, in case of emergency, the colored plastic lens allowing nearly one hundred per cent of the rays of light to penetrate through it. Further, the applicant has provided a novel means of attaching the portable lens to a spotlight.

The above description hereinbefore set forth is merely the best mode of practicing the present invention, and there are many modifications and slight deviations still within the spirit and scope of the present invention which are too numerous to mention. It is the applicant's intention to include every modification and deviation of the present invention that is within the length, breadth, and scope of the appended claims.

What is claimed is:

1. An attachment for a spotlight comprising a concavo-convex lens assembled on a casing of dome-like formation, said attachment comprising a portable lens having a curvature corresponding to that of said spotlight lens, a plurality of hook-like clips arranged in spaced relation with respect to each other and secured to the outer face of said portable lens adjacent the periphery thereof, a pair of elastic bands arranged in criss-cross relation with respect to each other and secured together at their crossing point, a loop secured to each of the ends of said pair of elastic bands, said pair of elastic bands being adapted to extend over said dome-like casing with said loops hooked into said clips whereby said portable lens is held in snug engagement with said spotlight lens, and means for maintaining said portable lens in spaced relationship with said spotlight lens to prevent scratching of said portable lens.

2. An attachment for a spotlight including a concavo-convex lens mounted on a dome-like casing, said attachment comprising a colored portable transparent lens fabricated of plastic corresponding to that of said spotlight lens, a plurality of hook-like clips arranged about the outer face of said portable lens adjacent the periphery thereof, means for securing said clips to said lens so as to maintain the portable lens in spaced relation with said spot light lens so as to prevent scratching of the portable lens, a pair of elastic bands arranged in criss-cross relation with respect to each other and secured together at their crossing point, and a loop secured to each of the ends of said pair of elastic bands, said portable lens being adapted to be positioned over said spotlight lens normally throwing white light, said pair of elastic bands being adapted to extend over said dome-like casing with said loops hooked into said clips.

References Cited in the file of this patent

UNITED STATES PATENTS

| Number | Name | Date |
| --- | --- | --- |
| 1,720,531 | Siegel | July 9, 1929 |
| 1,942,442 | Motsinger | Jan. 9, 1934 |
| 2,107,801 | Query | Feb. 8, 1938 |
| 2,476,109 | Neitzel | July 12, 1949 |

FOREIGN PATENTS

| Number | Country | Date |
| --- | --- | --- |
| 246,311 | Great Britain | Jan. 28, 1926 |
| 283,788 | Great Britain | Jan. 19, 1928 |